June 24, 1952   H. G. BUSIGNIES   2,601,259
FORCE MEASURING DEVICE
Filed Dec. 7, 1945   2 SHEETS—SHEET 1
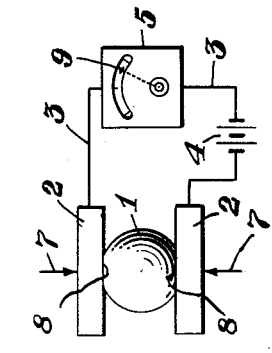
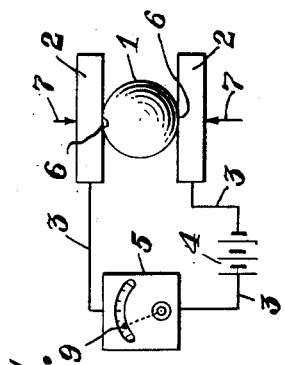
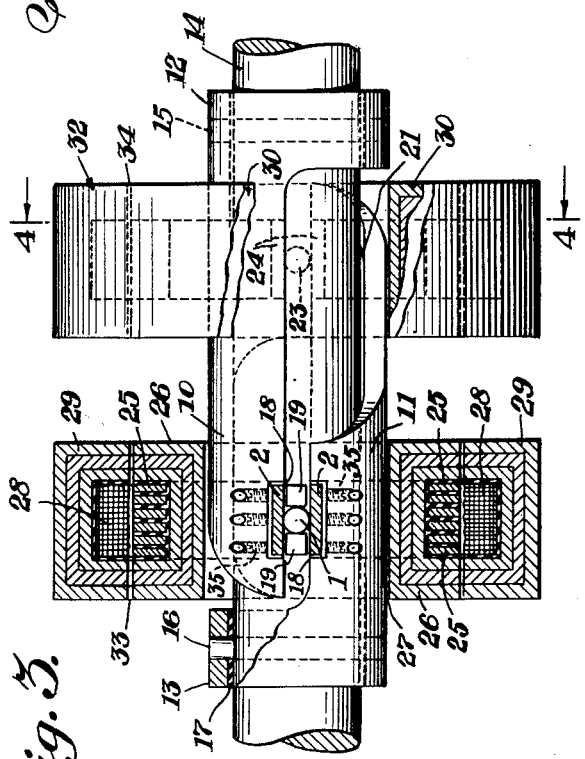
INVENTOR.
HENRI G. BUSIGNIES
BY
RP Morris
ATTORNEY

INVENTOR.
HENRI G. BUSIGNIES

BY
RP Morris
ATTORNEY

Patented June 24, 1952

2,601,259

UNITED STATES PATENT OFFICE 2,601,259

FORCE MEASURING DEVICE

Henri G. Busignies, Forest Hills, N. Y., assignor to Federal Telephone and Radio Corporation, New York, N. Y., a corporation of Delaware Application December 7, 1945, Serial No. 633,477

2 Claims. (Cl. 73—136)

This invention relates to a method and apparatus for measuring changes in mechanical pressure. More particularly it deals with a device which changes its electrical conductance or resistance in response to changes in pressure. One specific application of this device is in a torque meter.

It is an object of this invention to measure changes in mechanical pressure in a novel and effective manner.

It is another object to produce a simple electrical device for measuring changes in pressure which is free from rectifying effects.

Another object is to produce a simple electrical pressure measuring device which may be adapted for use as a torque meter.

Another object is to produce a torque meter which may be applied on short sections of shafts such as in aircraft motors.

Another object is to produce a torque meter which is not materially effected by external forces such as hysterises losses, changes in temperature, rectifier effects, corrosion, etc.

Still other objects and features will appear from time to time in the description which follows.

Generally speaking, the electrical measuring device of this invention comprises: (1) two metal members having contacting surfaces, the surface of one member having a greater radius of curvature than that of the other, and (2) means for measuring the change in potential between the two members when their surfaces are pressed together. The greater the pressure between the two surfaces, the greater is the electrical conductivity and the smaller is the electrical resistance between the two members, due to the increase in area of contact between the two surfaces.

These surfaces on the two contacting members may comprise, a sphere and a plane or, for example, a resilient metal ball (such as a ball of a ball bearing) held between resilient metal plates. The resilient metal members may be made of steel, phosphorous bronze, beryllium-copper, or other highly elastic and resilient metal alloys.

It is desirable that the metal contact between the two surfaces be kept free from corrosion. This may be done by enclosing the device in a sealed chamber, such as in a vacuum, and/or by coating the surfaces with a non-corrosive material which has a high electrical conductivity. It is also desirable that the metal contacting surfaces do not rectify the electricity passing through them, particularly if it is an alternating current, such as steel to steel contact. Suitable coating substances for the contacting members to overcome these difficulties are gold, silver, platinum, copper, etc. The coating should not be of such a thickness that the resilience of the metal member is materially effected.

The potential applied across the two contacting surfaces may be either direct current or alternating current. If alternating current is employed a comparatively low frequency is desirable such as between about 50 and 5,000 cycles per second.

The electrical circuit employed in measuring the change in potential across the two surfaces should be comparatively sensitive and may be any suitable resistance measuring device such as a Wheatstone bridge, potentiometer, or related circuit.

A specific application for the pressure measuring device of this invention is in torque meters. The contacting surfaces of the pressure measuring device may be mounted either on the shaft in which the torque is to be measured or may be stationarily mounted away from the shaft and coupled thereto through a hydraulic brake and piston system, or the like. If the two surfaces are mounted on the rotating shaft, they may be electrically connected to slip rings or magnetically coupled through induction coils surrounding the rotating shaft. If two or more of the contacting surfaces are employed in a measuring device they may be coupled so that the change in resistance in one accentuates the change in the other such as in a push-pull hook-up. In this type of hook-up it is desirable that the devices be placed under an initial pressure which is substantially intermediate of the pressure range within which they are going to be used.

These and other features and objects of the invention will become more apparent upon consideration of the following detailed description of an embodiment of the invention to be read in connection with the accompanying drawings in which:

Fig. 1 is a schematic diagram of one embodiment of this invention when not under pressure;

Fig. 2 is a schematic diagram of the embodiment shown in Fig. 1 when under pressure;

Fig. 3 is a partial section of the same embodiment employed in a torque meter;

Fig. 4 is a sectional view along the lines 4—4 of Fig. 3; and

Figure 5:
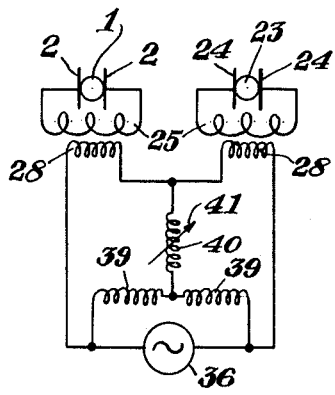
Figs. 5, 6, 7 and 8 are schematic wiring diagrams of alternating current circuits which may be employed in connection with the torque meter shown in Figs. 3 and 4.

Referring specifically to Figs. 1 and 2, there is schematically shown a resilient steel ball 1, which may be silver or gold plated, held between two steel plates 2, the adjacent surfaces of which may also be similarly plated. These plates 2 are connected through wires 3 in series with a potential source 4 and meter 5. This meter may be of any suitable design which is responsive to the change in flow of current from the battery through the wires 3, plates 2, and ball 1. The area of contact between the plates 2 and the ball 1 in Fig. 1 is shown at 6 to be comparatively small so that the resistance of the circuit is correspondingly comparatively large. In order to change the flow of current in the circuit pressure is applied in the direction of the arrows 7 to flatten the ball 1 as shown in Fig. 2 forming an area of contact 8 substantially larger than 6, thereby decreasing the resistance of the ball and plates 1 and 2 causing more current to flow through the circuit and meter 5. Thus, the needle 9 of the meter 5 indicates a higher reading than is indicated in Fig. 1. The scale of the meter 5 may be calibrated to read directly in pounds, of other units corresponding to the pressure applied in the direction of the arrows 7.

The pressure responsive device corresponding the ball 1 and plates 2 may be utilized in many different types of apparatus. One specific type is that of a torque meter specifically disclosed in Figs. 3 and 4. Referring now to Figs. 3 and 4, the ball 1 and plates 2 are shown clamped between a pair of jaws 10 and 11, respectively, integrally connected with sleeves 12 and 13 fixedly connected to the shaft 14 by pins or other suitable means 15 and 16, at the two spaced points on the shaft 14. The distance between these points may be as small as four or five inches and the shaft may be of substantially the same diameter as the distance between these points. It is desirable, since the members 1 and 2 are electrically coupled, to provide suitable insulation between the jaws 10 and 11 and the shaft 14 at 17, and also between the plates 2 and jaws 10 and 11 at 18. Suitable insulating and guiding blocks 19 and 20 may be provided around the ball 1 to hold it in place.

Also, integrally mounted on the sleeves 12 and 13 may be an additional pair of jaws 21 and 22, similar respectively to jaws 10 and 11. Between these jaws 10 and 11 may be mounted a ball and plate device 23 and 24, similar to 1 and 2, and shown in dotted lines in Fig. 3. It is desirable that the pair of jaws 21 and 22 be axially spaced from the pair 10 and 11 so that suitable electrical connections may be made to them as will be described later.

Although the plates 2 and 24 may be electrically connected with a measuring instrument by means of slip rings surrounding the jaws and shaft, it is desirable that a non-contacting coupling be made between the measuring instrument and these plates. One form of such a coupling is a magnetic coupling similar to that shown in Figs. 3 and 4 wherein an alternating current is employed in the coupling circuit. In the embodiment shown, the plates 2 and 24 are respectively connected to substantially low resistance electrical conductors 25, such as a series of split copper rings, which surround the shaft and jaw members and are intimately connected (such as by welding or soldering) to the two plates 2 and 24. These rings 25 form a secondary of a transformer circuit, the inductance in which may be increased by suitable laminated iron ring channels 26 surrounding the shaft between the secondary rings 25 and the jaw members 10 and 11. This secondary coil assembly, comprising the rings 25 and core 26, is mounted to turn with the shaft 14 and may be fixedly mounted to one of the jaws, preferably jaw 11, through an insulating layer 27.

Magnetically coupled to the secondary rings 25 is a stationary primary coil 28 which may be surrounded by laminated irong ring channels 29. The comparatively many turns of the wire in stationary coil 28 is then coupled to an electrical measuring circuit which will be described later.

Similarly the plates 24 are electrically coupled to a rotating secondary coil assembly 30 which may be fixedly connected to the jaw member 22 for rotation therewith. Surrounding the rotating secondary assembly 30 is a stationary primary coil assembly 32, similar to 28 and 29.

The only connections between the primary and secondary coils are air gaps 33 and 34 between the two coil assemblies.

It is desirable that the pressure device 1—2 and the pressure device 23—24 operate in opposition to each other, i. e., when one is being compressed the other is being released. This produces a greater effect in the outside electrical measuring circuit. In such a hook-up it is desirable that both pressure devices 1—2, and 23—24 be placed under an initial pressure by means of the screws 35 in each of the jaw members 10, 11, 21 and 22. This initial pressure should approximate the intermediate pressure of the range over which these devices are to respond.

Referring to Figs. 5, 6, 7 and 8, there are shown four different schematic wiring diagrams for coupling the primary and secondary coils of the two pressure devices employed in the torque meter shown in Figs. 3 and 4. In these wiring diagrams the pressure devices 1—2 and 23—24 are schematically shown and similarly numbered as are the primary and secondary coils 25 and 28.

Referring specifically to the diagram in Fig. 5, the coils 28 form two legs of a Wheatstone bridge across a stabilized alternating current source 36. The two stationary field coils 39 in the meter form the other two legs of the bridge. Coupling the junctures of the legs is a movable coil 40 to which is connected the needle 41 which cooperates with a scale (not shown) for indicating the amount of unbalance of the bridge. It can be seen that changes in the resistance of the secondary circuits 25 will correspondingly change the impedance of the primary circuits 28, thus unbalancing the bridge and causing the coil 40 to turn with the needle 41.

Figure 6:
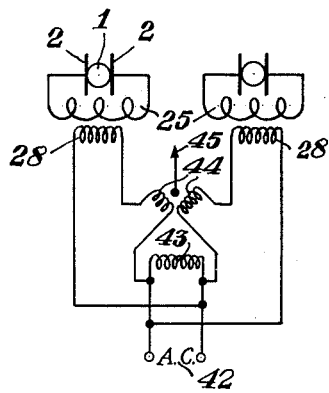

Referring to the circuit in Fig. 6 there is shown an alternating current supply source 42 in the meter a stationary field coil 43 and movable coils 44 connected to needle 45. In this circuit it is not necessary that the alternating supply current be stabilized. This particular circuit is adapted for use where the variation of the coil is large with respect to the fixed value in coil 43.

Figure 7:
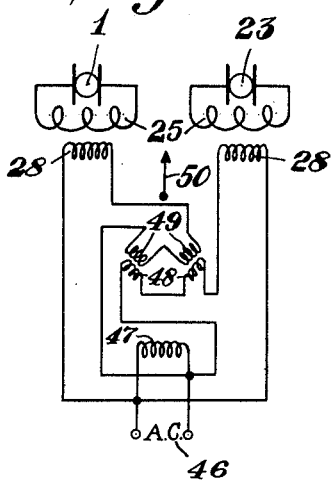

Referring to Fig. 7, there is shown still another possible circuit having an alternating current source 46 (which may or may not be stabilized), and in the meter stationary field coils 47 and 43 and movable field coils 49 connected to needle 45. In this circuit double crossed coils 43 and 49 are coupled so that the differences in current in the coils 48 and 49 on the left is compared with the sum of the current in the coils 48 and 49 on the right.

Figure 8:
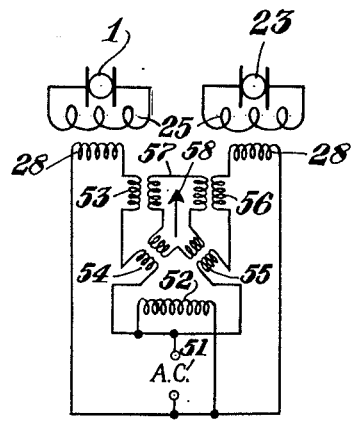

Referring to Fig. 8, there is shown an alternating current supply 51 which need not be stabilized, stationary field coils 52, 53, 54, 55 and 56, and movable coils 57 coupled to the needle 58. The double crossed coils 57 form a transformer to produce a sum current effect reducing the value of the field due to the fixed coils 52-56 thereby increasing the deflection of the needle 58 with respect to that obtained for a similar amount of current in the circuit shown in Fig. 6.

The crossed coils shown in the circuits above described may make an angle with each other larger than 90°, if such is desirable.

Although only one application of the pressure responsive device of this application has been disclosed, it is obvious from the foregoing description that it has other applications not only for measuring the difference in forces in other types of torque meters, but differences in forces generally including electric weighing equipment.

While the above is a description of the principles of this invention in connection with specific apparatus and a particular modification thereof, it is to be clearly understood that this description is made only by way of example and not as a limitation on the scope of this invention as defined in the accompanying claims.

I claim:

1. A torque meter comprising: a shaft in which the torque is to be measured, a pair of jaws rigidly attached to said shaft at different axially spaced points and extending into spaced overlapping relationship with one another, a resilient metal ball clamped between two resilient metal plates between said jaws, said ball and at least one of said metal plates being electrically insulated from said shaft, means for applying a potential between one of said plates and the other through said ball, and means for measuring the resistance between said plates according to the change in pressure on said plates by said jaws in proportion to the torque in said shaft between said spaced points, whereby variations in the pressure between said plates produce variations in the contact areas between said ball and said plates which produce variations in the resistance between said plates.

2. A device for measuring shaft torque comprising a pair of jaws rigidly attached to said shaft at different axially spaced points and extending into spaced overlapping relationship with one another, a resilient metal ball, a pair of resilient metal plates said plates being respectively attached to each of said jaws said ball being clamped between said plates, said ball and said plates being electrically insulated from said shaft, a source of electric potential, means to apply said potential between said plates and said ball, means for measuring the change of electrical resistance between said plates and said ball whereby the variations in pressure between the spaced points on said shaft to which said jaws are attached produce variations in the contact areas between said ball and said plates thus producing corresponding changes of electrical resistance between said plates.

HENRI G. BUSIGNIES.

REFERENCES CITED

The following references are of record in the file of this patent:

UNITED STATES PATENTS

| Number | Name | Date |
| --- | --- | --- |
| 1,681,314 | Vawter | Aug. 21, 1928 |
| 1,695,295 | Rollins | Dec. 18, 1928 |
| 1,781,002 | Pelterie | Nov. 11, 1930 |
| 2,049,330 | Smith | July 28, 1936 |
| 2,415,513 | Martin et al. | Feb. 11, 1947 |
| 2,419,217 | Isenberg | Apr. 22, 1947 |
| 2,426,396 | Isenberg | Aug. 26, 1947 |

FOREIGN PATENTS

| Number | Country | Date |
| --- | --- | --- |
| 470,454 | Germany | Jan. 15, 1929 |
| 226,861 | Great Britain | Dec. 19, 1924 |
| 529,843 | Germany | July 17, 1931 |

OTHER REFERENCES

Publication, "Journal of the Institute of Electrical Engineers" (British), July 1045, page 287.